US012703353B2

(12) United States Patent
Yasuda et al.

(10) Patent No.: US 12,703,353 B2
(45) Date of Patent: Aug. 11, 2026

(54) SYSTEMS AND METHODS FOR REACTIVELY REORIENTING A MOVING VEHICLE

(71) Applicant: Toyota Research Institute, Inc., Los Altos, CA (US)

(72) Inventors: Hiroshi Yasuda, San Carlos, CA (US); Andrea Michelle Rios Lazcano, Brussels (BE)

(73) Assignees: Toyota Research Institute, Inc., Los Altos, CA (US); Toyota Jidosha Kabushiki Kaisha, Toyota (JP)

(*) Notice: Subject to any disclaimer, the term of this patent is extended or adjusted under 35 U.S.C. 154(b) by 125 days.

(21) Appl. No.: 18/764,667

(22) Filed: Jul. 5, 2024

(65) Prior Publication Data

US 2026/0008456 A1 Jan. 8, 2026

(51) Int. Cl.
*B60W 30/095* (2012.01)
*B60W 30/085* (2012.01)
(Continued)

(52) U.S. Cl.
CPC ........ *B60W 30/095* (2013.01); *B60W 30/085* (2013.01); *B60W 30/09* (2013.01);
(Continued)

(58) Field of Classification Search
CPC ...... B60W 10/20; B60W 50/14; B60W 30/12; B60W 2540/18; B60W 2540/225;
(Continued)

(56) References Cited

U.S. PATENT DOCUMENTS 3,903,983 A * 9/1975 Yeske .................. B62D 7/1509 180/414
4,263,979 A * 4/1981 Sturgill ................ B62D 7/1509 180/411
(Continued)

FOREIGN PATENT DOCUMENTS

DE 102010003099 A1 9/2011
JP 2009280015 A * 12/2009
(Continued)

OTHER PUBLICATIONS

Youtube, "Crab Walk Hyundai Ioniq 5—Hyundai 's e-Corner Embarrasses GMC Hummer's!", Retrieved from the Internet: https://www.youtube.com/watch?v=UZPDi1C3nAE, Retrieved Jul. 5, 2024.
(Continued)

*Primary Examiner* — Lindsay M Low
*Assistant Examiner* — Brian R Kirby
(74) *Attorney, Agent, or Firm* — Christopher G. Darrow; Darrow Mustafa PC

(57) ABSTRACT

Systems and methods described herein relate to reactively reorienting a moving vehicle. In one embodiment, a reactive moving-vehicle reorientation system detects automatically, at an over-actuated vehicle, a predetermined situation while the over-actuated vehicle is traveling on a roadway. The system also controls automatically the wheels of the over-actuated vehicle to rotate the cabin of the over-actuated vehicle sideways at an angle relative to the direction of travel of the over-actuated vehicle in response to detecting the predetermined situation. Multiple applications of this capability are described herein.

20 Claims, 5 Drawing Sheets

(51) Int. Cl.
*B60W 30/09* (2012.01)
*B60W 30/12* (2020.01)
*B62D 7/14* (2006.01)
*B62D 7/15* (2006.01)
*B62D 21/18* (2006.01)

(52) U.S. Cl.
CPC ............... *B60W 30/12* (2013.01); *B62D 7/14* (2013.01); *B62D 7/1509* (2013.01); *B62D 21/186* (2013.01); *B60W 2554/4048* (2020.02)

(58) Field of Classification Search
CPC ....... B60W 2510/20; B60W 30/18163; B60W 30/045; B60W 30/02; B60W 10/08; B62D 7/1509; B62D 33/063; B62D 6/00; B62D 7/14
USPC .................................................... 701/41, 301
See application file for complete search history.

(56) References Cited

U.S. PATENT DOCUMENTS 4,592,439 A * 6/1986 Collard ................ B60K 17/356 180/41
5,607,028 A * 3/1997 Braun .................. B62D 7/1509 180/408
5,996,722 A * 12/1999 Price .................. B60G 17/0152 180/234
6,359,553 B1 * 3/2002 Kopischke ........ B60R 21/01512 340/436
6,722,610 B1 * 4/2004 Rawdon .................. B64C 25/50 244/103 W
7,316,288 B1 * 1/2008 Bennett .................... B62K 5/08 180/413
9,199,728 B2 * 12/2015 Hahn .................... B60T 8/1703
9,406,234 B2 8/2016 Yellambalase et al.
9,809,169 B1 11/2017 Naboulsi
10,290,214 B2 5/2019 Zhang
10,640,201 B2 * 5/2020 Takenaka ............. G05D 1/0083
2005/0107939 A1 * 5/2005 Sadano ............... B60T 8/17557 701/1
2008/0017436 A1 * 1/2008 Dower ................. B62D 7/1509 180/402
2008/0086269 A1 * 4/2008 Joe ..................... B62D 15/0265 701/301
2010/0049375 A1 * 2/2010 Tanimoto .................. B60T 7/12 701/1
2011/0106382 A1 * 5/2011 Kageyama ............... B62D 6/04 701/42
2011/0231095 A1 * 9/2011 Nakada ................. B60W 30/12 701/301
2012/0300072 A1 11/2012 Kim
2014/0145498 A1 * 5/2014 Yamakado .............. B60T 8/245 303/3
2016/0107687 A1 * 4/2016 Yamaoka ............. B62D 15/025 701/41
2017/0101091 A1 * 4/2017 Nilsson ............. B60W 30/0953
2018/0297638 A1 * 10/2018 Fujii .................. B62D 15/0255
2019/0270448 A1 * 9/2019 Takasao ................ B60W 10/18
2020/0079365 A1 * 3/2020 Choi ..................... B60W 10/20
2021/0024000 A1 1/2021 Peterson et al.
2021/0380165 A1 * 12/2021 Chao .................... B62D 7/1509
2021/0387573 A1 12/2021 Hinson et al.
2022/0189293 A1 * 6/2022 Kang ..................... G08G 1/166

FOREIGN PATENT DOCUMENTS

KR 101660635 B1 9/2016
KR 20190087714 A 7/2019
KR 20220136568 A * 10/2022
WO WO-0123241 A2 * 4/2001 ........... A01B 51/023
WO WO-2009092374 A1 * 7/2009 .......... B60T 8/17558
WO WO-2023165999 A1 * 9/2023 ...... B60W 30/18145

OTHER PUBLICATIONS

Youtube, "How does In-Wheel Motor Technology Work? | Four Motor Drive & Torque Vectoring", Retrieved from the Internet: https://www.youtube.com/watch?v=yS3w2ljkzxU, Retrieved Jul. 5, 2024.

Aishwarya et al. "Adaptive Headlight System for Automobiles." International Journal of Engineering Research & Technology, NCCDS—2020 Conference Proceedings, vol. 8, Issue 13 (2020) Available at https://acrobat.adobe.com/id/urn:aaid:sc:VA6C2:728517b1-0ed9-4cc4-a2d8-0edf6f29a340.

* cited by examiner

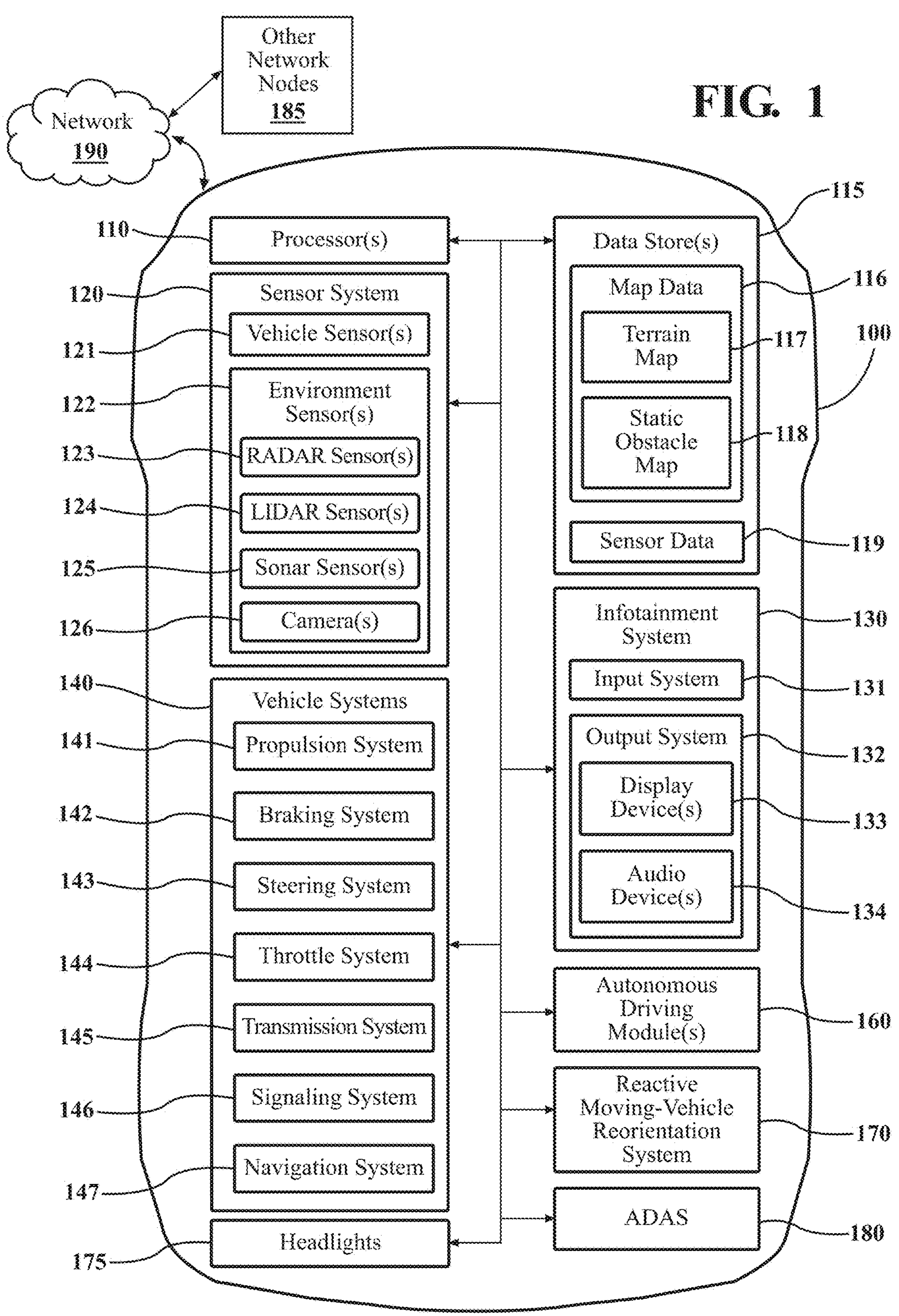
Other Network Nodes 185
FIG. 1
Network 190
115
110
Processor(s)
Data Store(s)
120
Sensor System
Map Data
116
121
Vehicle Sensor(s)
Terrain Map
117
100
122
Environment Sensor(s)
Static Obstacle Map
118
123
RADAR Sensor(s)
124
LIDAR Sensor(s)
125
Sonar Sensor(s)
Sensor Data
119
126
Camera(s)
Infotainment System
130
140
Vehicle Systems
Input System
131
141
Propulsion System
Output System
132
142
Braking System
Display Device(s)
133
143
Steering System
Audio Device(s)
134
144
Throttle System
Autonomous Driving Module(s)
160
145
Transmission System
146
Signaling System
Reactive Moving-Vehicle Reorientation System
170
147
Navigation System
ADAS
180
175
Headlights Network
190
Other
Network
Nodes
185
Database
240
Sensor
Data
119
System
Data
250
Processor(s)
110
Reactive
Moving-Vehicle
Reorientation
System
170
Memory 210
Situation
Detection
Module
220
Reorientation
Module
230
Sensor
System
120
ADAS
180
Autonomous
Driving Module(s)
160

SYSTEMS AND METHODS FOR REACTIVELY REORIENTING A MOVING VEHICLE

TECHNICAL FIELD

The subject matter described herein generally relates to vehicles and, more particularly, to systems and methods for reactively reorienting a moving vehicle.

BACKGROUND

As a vehicle is traveling on a roadway, situations other than accidents sometimes arise that pose challenges to vehicle occupants or to the occupants of other vehicles. To some extent, these challenges are inherent in the designs of conventional vehicles.

SUMMARY

An example of a system for reactively reorienting a moving vehicle is presented herein. The system comprises a processor and a memory storing machine-readable instructions that, when executed by the processor, cause the processor to detect automatically, at an over-actuated vehicle, a predetermined situation while the over-actuated vehicle is traveling on a roadway. The memory also stores machine-readable instructions that, when executed by the processor, cause the processor to control automatically the wheels of the over-actuated vehicle to rotate the cabin of the over-actuated vehicle sideways at an angle relative to the direction of travel of the over-actuated vehicle in response to detecting the predetermined situation.

Another embodiment is a non-transitory computer-readable medium for reactively reorienting a moving vehicle and storing instructions that, when executed by a processor, cause the processor to detect automatically, at an over-actuated vehicle, a predetermined situation while the over-actuated vehicle is traveling on a roadway. The instructions also cause the processor to control automatically the wheels of the over-actuated vehicle to rotate the cabin of the over-actuated vehicle sideways at an angle relative to the direction of travel of the over-actuated vehicle in response to detecting the predetermined situation.

In another embodiment, a method of reactively reorienting a moving vehicle is disclosed. The method comprises detecting automatically, at an over-actuated vehicle, a predetermined situation while the over-actuated vehicle is traveling on a roadway. The method also includes controlling automatically the wheels of the over-actuated vehicle to rotate the cabin of the over-actuated vehicle sideways at an angle relative to the direction of travel of the over-actuated vehicle in response to detecting the predetermined situation.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 1 illustrates one embodiment of an over-actuated vehicle within which systems and methods disclosed herein may be implemented.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

Figure 2:
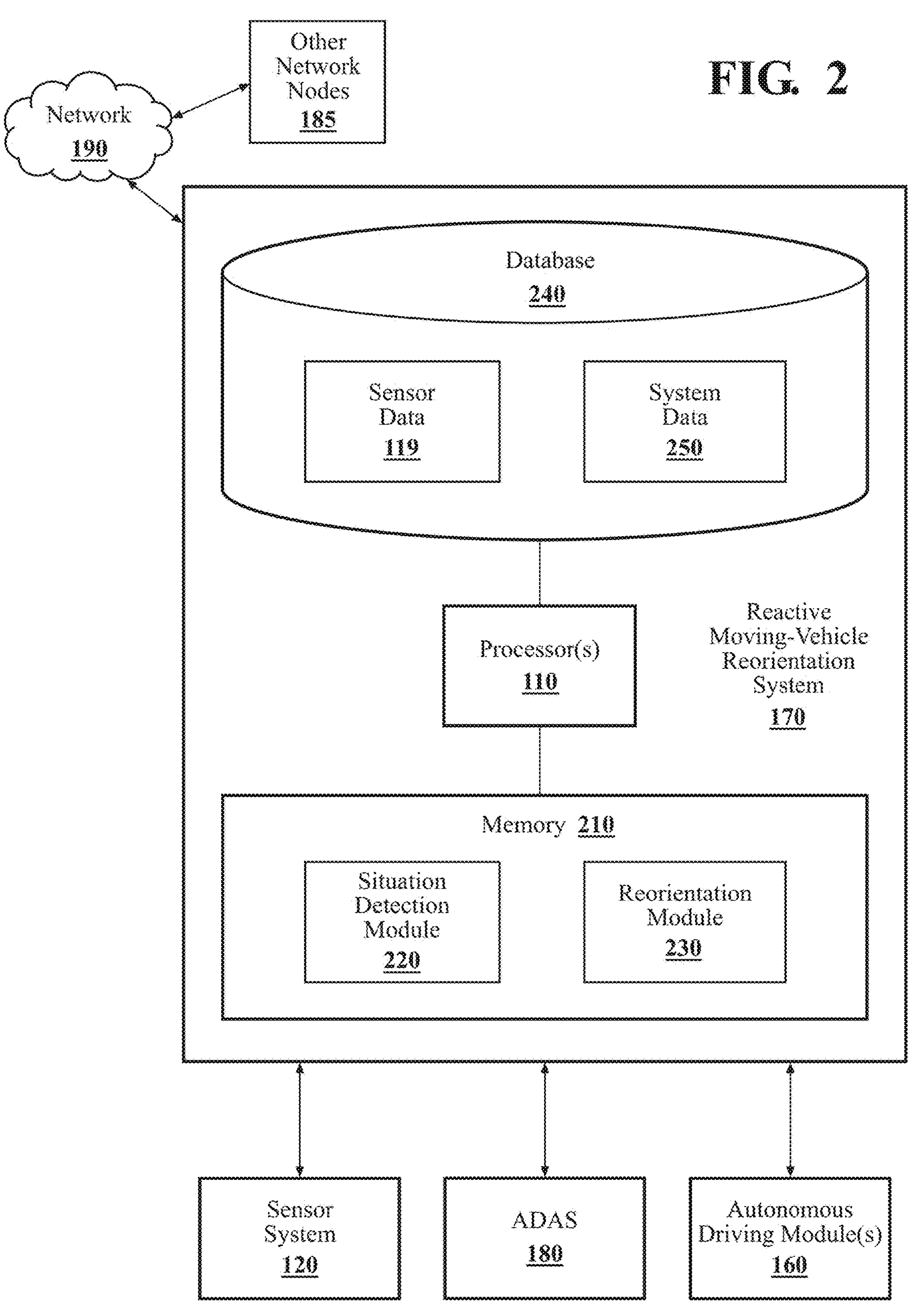
FIG. 2 is a block diagram of a reactive moving-vehicle reorientation system, in accordance with an illustrative embodiment of the invention.

One example of a situation that arises while a vehicle is traveling on a roadway is that the driver of the vehicle has difficulty seeing whether it is safe to change lanes to the right or left. This is partly due to the well-known phenomenon of a "blind spot" on either side and somewhat toward the rear of the vehicle in the adjacent lane. Even the combination of a rearview mirror and a side mirror is insufficient, in some cases, to enable the driver to determine whether there is another vehicle in a blind spot.

Another example of a situation that arises when a vehicle is traveling on a roadway is that, at nighttime, the headlights of the vehicle may shine directly into oncoming traffic (into the eyes of the occupants of vehicles traveling in the opposite direction on the roadway). A low-beam setting for the headlights helps to reduce the severity of the problem but does not eliminate it.

Various embodiments of systems and methods for reactively reorienting a moving vehicle described herein solve both problems mentioned above. The various embodiments take advantage of the unique capabilities of over-actuated vehicles. Herein, an "over-actuated vehicle" is a vehicle whose wheels can be independently propelled and steered. Such a vehicle has greater than two degrees of freedom. In some embodiments, however, the two front wheels and the two rear wheels each have a conventional steering arrangement so that the two front wheels are steered together in the same direction and the two rear wheels are also steered together in the same direction, but the two sets of wheels (front and back) can be steered independently of each other. In some implementations, an over-actuated vehicle's wheels include in-wheel motors (also known as "hub motors"). Due to the complexity of over-actuated vehicles, over-actuated vehicles typically control the wheel actuators via steer-by-wire systems.

As those skilled in the art are aware, an over-actuated vehicle has greater maneuvering flexibility than a traditional vehicle. For example, an over-actuated vehicle, in some embodiments, can execute maneuvers such as a "zero turn"

(spinning in place), diagonal driving, “crab driving” (driving straight sideways), and a pivot turn.

One solution to the two problems mentioned above—determining whether it is safe to change lanes and headlights shining into oncoming traffic—is to reorient the cabin of an over-actuated vehicle so the cabin of the over-actuated vehicle is pointed at an angle relative to the direction of travel (the direction in which the wheels are pointed). In an over-actuated vehicle, this can be accomplished by controlling the torque (propulsion) and steering of the wheels individually or by controlling independently controllable front and back sets of wheels that have conventional steering, as discussed above. In the various embodiments described herein, a reactive moving-vehicle reorientation system in an over-actuated vehicle automatically detects a predetermined situation while the over-actuated vehicle is traveling on a roadway and automatically reacts to the detected situation. More specifically, in response to detecting the predetermined situation, the system automatically controls the wheels of the over-actuated vehicle to rotate the cabin of the over-actuated vehicle sideways at an angle relative to the direction of travel of the over-actuated vehicle. Two predetermined situations of interest are those discussed above: (1) an impending (imminent) lane change by the over-actuated vehicle and (2) oncoming traffic at nighttime.

In the case of an imminent lane change, the reactive moving-vehicle reorientation system automatically detects that the over-actuated vehicle is about to change lanes and automatically controls the wheels of the over-actuated vehicle so that the cabin of the over-actuated vehicle is rotated toward the target lane of the lane change (the lane the over-actuated vehicle will occupy after the lane change) to improve an over-actuated-vehicle occupant's (e.g., the driver's) view of the target lane prior to execution of the lane change. This overcomes the problem of a blind spot in the target lane by giving the driver a clear view of the target lane before the lane change.

In the case of oncoming traffic at nighttime, the reactive moving-vehicle reorientation system automatically detects the presence of oncoming traffic (one or more vehicles traveling on the roadway in the opposite direction of the over-actuated vehicle—the “ego vehicle”). In response, the system automatically controls the wheels of the over-actuated vehicle so that the cabin of the over-actuated vehicle is rotated away from the oncoming traffic to avoid shining the headlights of the over-actuated vehicle directly into the oncoming traffic.

After the detected situation has passed (i.e., after the over-actuated vehicle has completed the lane change or after there is no longer oncoming traffic present), the reactive moving-vehicle reorientation system automatically controls the wheels of the over-actuated vehicle to re-align the cabin of the over-actuated vehicle with the direction of travel (i.e., with the direction in which the wheels are pointed).

It should be noted that the various embodiments of systems and methods for reactively reorienting a moving vehicle described herein do not involve detaching bottom and top chassis portions and rotating the top portion of the chassis relative to the bottom portion. Instead, the wheels of an over-actuated vehicle are controlled in such a way that the vehicle's cabin turns at an angle relative to the direction of travel. Thus, the entire chassis of the vehicle is rotated sideways at an angle relative to the direction of travel by virtue of the way the wheels are controlled.

The two embodiments (imminent lane change and oncoming traffic at nighttime) introduced above are discussed in greater detail below in connection with FIGS. 3A-3C, 4A, and 4B.

Referring to FIG. 1, an example of an over-actuated vehicle 100 in which systems and methods disclosed herein can be implemented is illustrated. In some embodiments, the over-actuated vehicle 100 is an automobile, a truck, or a recreational vehicle (RV). In some embodiments, the over-actuated vehicle 100 is manually driven by a human driver. In other embodiments, over-actuated vehicle 100 can operate, at least some of the time, in an autonomous driving mode (e.g., SAE Levels 3-5, Level 5 corresponding to full autonomy). In still other embodiments, over-actuated vehicle 100 can operate, at least some of the time, in a semi-autonomous driving mode (e.g., via an adaptive cruise-control system, an automatic lane-change assistance system, an automatic parking system, and/or an Advanced Driver-Assistance System (ADAS) 180). The over-actuated vehicle 100 can include a reactive moving-vehicle reorientation system 170 (hereinafter sometimes referred to simply as a “system 170”) to benefit from the functionality discussed herein. Instances of over-actuated vehicle 100, as used herein, are equally applicable to any device capable of incorporating the systems or methods described herein.

The over-actuated vehicle 100 also includes various other elements. It will be understood that, in various implementations, it may not be necessary for the over-actuated vehicle 100 to have all the elements shown in FIG. 1. The over-actuated vehicle 100 can have any combination of the various elements shown in FIG. 1. Further, the over-actuated vehicle 100 can have additional elements to those shown in FIG. 1. In some arrangements, the over-actuated vehicle 100 may be implemented without one or more of the elements shown in FIG. 1, including reactive moving-vehicle reorientation system 170. While, in FIG. 1, the various elements are shown as being located within the over-actuated vehicle 100, it will be understood that one or more of these elements can be located external to the over-actuated vehicle 100. Further, the elements shown may be physically separated by large distances. As shown in FIG. 1, in some embodiments, over-actuated vehicle 100 can communicate with other network nodes 185 (e.g., other connected vehicles, cloud servers, edge servers, roadside units, infrastructure devices and equipment, etc.) via a network 190. In some embodiments, network 190 includes the Internet.

Some of the other possible elements of over-actuated vehicle 100 are shown in FIG. 1 and will be described in connection with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

Depending on the particular embodiment, over-actuated vehicle 100 includes various elements that support automatically detecting the predetermined situations discussed above and, in some embodiments, semi-autonomous and/or fully autonomous driving. For example, sensor system 120 can include one or more vehicle sensors 121. Vehicle sensors 121 can include one or more positioning systems such as a dead-reckoning system or a global navigation satellite system (GNSS) such as a global positioning system (GPS). Vehicle sensors 121 can also include Controller-Area-Network (CAN) sensors that output, for example, speed and steering-angle data pertaining to over-actuated vehicle 100. Sensor system 120 can also include one or more environment sensors 122. Environment sensors 122 generally include, without limitation, radar sensor(s) 123, Light Detection and Ranging (LIDAR) sensor(s) 124, sonar sensor(s) 125, and camera(s) 126. One or more of these various types of environment sensors 122 can be used to ascertain the state of over-actuated vehicle 100 (its speed, acceleration, observed trajectory data, etc.) and to detect moving or stationary objects such as external road agents or other objects in the environment of over-actuated vehicle 100, whether the road agents or objects are on or off the roadway. Thus, sensor system 120 contributes to over-actuated vehicle 100 "understanding" and responding to the environment surrounding over-actuated vehicle 100.

As mentioned above, in some embodiments, over-actuated vehicle 100 includes autonomous driving module(s) 160 and/or ADAS 180 to control fully autonomous or semi-autonomous driving modes of over-actuated vehicle 100, respectively. The autonomous driving module(s) 160 and/or ADAS 180 can do so by controlling various vehicle systems 140 of over-actuated vehicle 100.

In the various embodiments described herein, the wheels (not shown in FIG. 1) and the vehicle systems 140, particularly propulsion system 141 and steering system 143, of over-actuated vehicle 100 are designed and arranged to enable the wheels of over-actuated vehicle 100 to be independently propelled and steered. As discussed above, in some embodiments, the two front wheels and the two rear wheels each have a conventional steering arrangement so that the two front wheels are steered together in the same direction and the two rear wheels are also steered together in the same direction, but the two sets of wheels (front and back) can be steered independently of each other. As also discussed above, in some implementations, the wheels of the over-actuated vehicle 100 include in-wheel motors.

As shown in FIG. 1, over-actuated vehicle 100 includes headlights 175 (technically, headlamps that generate light that shines forward ahead of over-actuated vehicle 100). Headlights 175 are discussed further below in connection with FIGS. 4A and 4B.

FIG. 2 is a block diagram of a reactive moving-vehicle reorientation system 170, in accordance with an illustrative embodiment of the invention. In the embodiment of FIG. 2, reactive moving-vehicle reorientation system 170 is shown as including one or more processors 110 from the over-actuated vehicle 100 of FIG. 1. In general, the one or more processors 110 may be a part of reactive moving-vehicle reorientation system 170, reactive moving-vehicle reorientation system 170 may include one or more separate processors from the one or more processors 110 of the over-actuated vehicle 100, or reactive moving-vehicle reorientation system 170 may access the one or more processors 110 through a data bus or another communication path, depending on the embodiment.

In the embodiment of FIG. 2, memory 210 stores a situation detection module 220 and a reorientation module 230. The memory 210 is a random-access memory (RAM), read-only memory (ROM), a hard-disk drive, a flash memory, or other suitable memory for storing the modules 220 and 230. The modules 220 and 230 are, for example, machine-readable instructions that, when executed by the one or more processors 110, cause the one or more processors 110 to perform the various functions disclosed herein.

Reactive moving-vehicle reorientation system 170 can store various kinds of data in a database 240. Examples include sensor data 119 from sensor system 120 (refer to FIG. 1) and system data 250. System data 250 can include a variety of persistent and temporary types of data used by system 170, such as system parameters, decision thresholds, the results of intermediate calculations, etc.

As shown in FIG. 2 and as discussed above, system 170 can communicate with one or more other network nodes 185 (e.g., other connected vehicles, cloud servers, edge servers, roadside units, infrastructure, etc.) via network 190. In communicating with other network nodes 185, over-actuated vehicle 100 can employ technologies such as cellular data (e.g., LTE, 5G, 6G), Dedicated Short-Range Communications (DSRC), or Bluetooth® Low Energy (BLE). As also shown in FIG. 2, system 170 interfaces and communicates with sensor system 120, autonomous driving module(s) 160, and ADAS 180.

Situation detection module 220 generally includes machine-readable instructions that, when executed by the one or more processors 110, cause the one or more processors 110 to detect automatically, at an over-actuated vehicle 100, a predetermined situation while the over-actuated vehicle 100 is traveling on a roadway. For the sake of illustration, two different predetermined situations are discussed below in greater detail in connection with FIGS. 3A-3C and FIGS. 4A and 4B. These two situations correspond to the two embodiments discussed above. However, these two situations are not the only situations to which the system 170 can react by rotating the cabin of the over-actuated vehicle 100 at an angle relative to the direction of travel.

In a first embodiment, the predetermined situation is a lane change of the over-actuated vehicle 100 being imminent. In this embodiment, situation detection module 220 detects that the human driver of over-actuated vehicle 100 intends to change lanes imminently or that the autonomous or semi-autonomous driving systems (e.g., autonomous driving module(s) 160 or ADAS 180) of over-actuated vehicle 100 will imminently cause over-actuated vehicle 100 to change lanes in accordance with the vehicle's path-planning algorithm. If over-actuated vehicle 100 is driven manually by a human driver, situation detection module 220 can detect the driver's intention to change lanes using one or more of several different techniques. Examples include, without limitation, detecting that the driver has activated a turn signal; that, according to GPS (map) data, a lane change will soon be required (e.g., the current lane in which over-actuated vehicle 100 is traveling is about to end and merge with an adjacent lane); and that, based on an analysis of sensor data 119 (e.g., passenger-compartment-camera images), the driver's behavior (e.g., gaze direction) indicates that the driver is about to change lanes. In a different embodiment, over-actuated vehicle 100 includes a speech-recognition-based user interface that permits the driver to speak an intention to change lanes beforehand (e.g., "I want to change lanes to the left [or right]"). In such an embodiment, situation detection module 220 detects the driver's intention to change lanes by virtue of the driver's spoken statement.

In a second embodiment, the predetermined situation is the presence of oncoming traffic at nighttime. In this embodiment, situation detection module 220 detects oncoming traffic at nighttime using one or more techniques. Examples include, without limitation, detecting the headlights or other features of the oncoming vehicle(s) directly based on an analysis of sensor data 119 and vehicle-to-vehicle (V2V) communication. For example, an oncoming vehicle can transmit a message V2V message to the ego (over-actuated) vehicle 100 to make the ego vehicle aware of its presence.

In some embodiments, situation detection module 220 also detects that the headlights 175 of over-actuated vehicle 100 are shining toward the oncoming traffic and to what extent the light pattern output by the headlights 175 encompasses or will encompass the oncoming traffic. This determination can be made based on knowledge of the light pattern output by the headlights 175 (e.g., its shape, width, intensity, etc.).

Figures 3A, 3B, 3C:
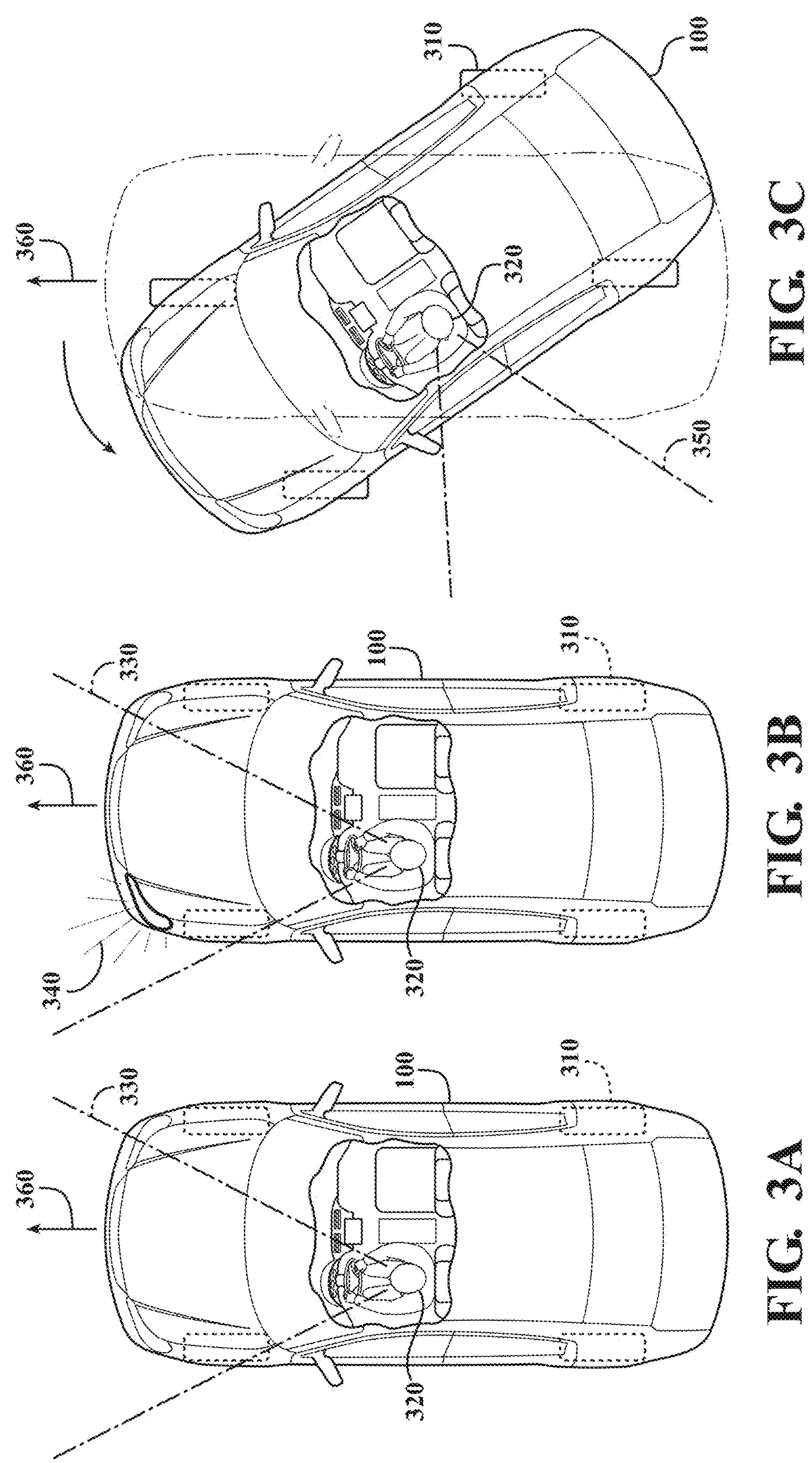
FIGS. 3A, 3B, and 3C illustrate reorienting the cabin of a moving over-actuated vehicle relative to the direction of travel of the over-actuated vehicle, in accordance with an illustrative embodiment of the invention.

Reorientation module 230 generally includes machine-readable instructions that, when executed by the one or more processors 110, cause the one or more processors 110 to control automatically the wheels of the over-actuated vehicle 100 to rotate the cabin of the over-actuated vehicle 100 sideways at an angle relative to the direction of travel of the over-actuated vehicle 100 in response to detecting the predetermined situation. FIGS. 3A-3C illustrate this reorientation of the cabin in connection with the first embodiment discussed above (imminent lane change), and FIGS. 4A and 4B illustrate reorientation of the cabin in connection with the second embodiment discussed above (oncoming traffic at nighttime). As mentioned above, these two embodiments are illustrative of situations in which the cabin of the vehicle can be reactively rotated on an angle relative to the direction of travel to overcome a problem, but they are not the only such situations.

FIGS. 3A, 3B, and 3C illustrate reorienting the cabin of a moving over-actuated vehicle 100 relative to the direction of travel 360 of the over-actuated vehicle 100, in accordance with a first illustrative embodiment of the invention. In FIG. 3A, an over-actuated vehicle 100 is traveling on a roadway. The wheels 310 of over-actuated vehicle 100 are, of course, aligned with the direction of travel 360. The driver 320 is looking ahead, and the driver's field of view 330 is illustrated in FIG. 3A.

Referring to FIG. 3B, at some point in time, driver 320 decides to change lanes to the left. In this case, the target lane is the lane to the left and adjacent to the current lane in which over-actuated vehicle 100 is traveling. Driver 320 activates the left turn signal in preparation to change lanes to the left, and the vehicle's turn-signal indicator 340 (a flashing-light arrow icon and associated clicking sound) is activated. In this example, situation detection module 220 detects the impending lane change based at least on the driver's activation of the left turn signal.

In response to situation detection module 220 detecting the imminent intended lane change, reorientation module 230 controls the wheels of over-actuated vehicle 100 to cause the cabin of over-actuated vehicle 100 to rotate to the left sideways (toward the target lane), as depicted in FIG. 3C. Note that the wheels 310 are still pointing in the direction of travel 360, but the cabin has been rotated to the left at an angle relative to the direction of travel 360 as the over-actuated vehicle 100 continues to travel along the roadway. This reorientation of the cabin permits the driver 320, via a modified field of view 350, to benefit from an improved (clearer) view of the target lane before committing fully to the planned lane change.

In some implementations of the first embodiment, reorientation module 230 includes further machine-readable instructions that, when executed by the one or more processors 110, cause the one or more processors 110 to analyze sensor data 119 to ensure there is at least a predetermined amount of clearance in the immediate vicinity of the over-actuated vehicle 100 before controlling automatically the wheels of the over-actuated vehicle 100 to rotate the cabin of the over-actuated vehicle 100 toward the target lane. This ensures that rotating the cabin of the over-actuated vehicle 100 on an angle toward the target lane does not result in the over-actuated vehicle 100 striking or obstructing another road user in the vehicle's blind spot.

The angle to which the cabin is rotated relative to the direction of travel 360 varies, depending on the implementation. In one implementation, the angle is a predetermined angle (e.g., 20 degrees). In another implementation, the angle is based on the measured available clearance in the target lane as determined from an analysis of sensor data 119 by reorientation module 230. In yet another implementation, the angle is based on the over-actuated vehicle occupant's (e.g., the driver's) detected gaze direction, based on an analysis of sensor data 119. That is, the angle of rotation can be adapted to give the occupant (e.g., the driver) of the over-actuated vehicle 100 the best possible view of the target lane based on the direction in which the occupant is currently looking just prior to the lane change.

In some implementations of the first embodiment, reorientation module 230 includes further machine-readable instructions that, when executed by the one or more processors 110, cause the one or more processors 110 to control automatically the wheels 310 of the over-actuated vehicle 100 to re-align the cabin of the over-actuated vehicle 100 with the direction of travel 360 in the target lane after the execution of the lane change in response to the over-actuated vehicle 100 being steered in a direction opposite that of the lane change. In other words, in the example of FIGS. 3A-3C, reorientation module 230 detects that the driver (or autonomous driving module(s) 160 or ADAS 180) has begun to steer back to the right in the target lane and, in response, re-aligns the cabin with the wheels 310 once again in the direction of travel 360. The timing of re-alignment of the cabin with the wheels 310 can differ somewhat, depending on the particular implementation of the first embodiment.

In implementations of the first embodiment in which the over-actuated vehicle 100 is an autonomous or semi-autonomous vehicle, it is still advantageous for the system 170 to reorient the cabin of the over-actuated vehicle 100 to give one or more vehicle occupants an improved view of the target lane for the impending lane change because it can increase the trust the vehicle occupants have in the autonomous or semi-autonomous driving system of the over-actuated vehicle 100. In such an embodiment, the over-actuated vehicle 100 relies on one or more types of environment sensors 122 to detect other road users in the target lane, including in the blind spot. By rotating the cabin toward the target lane to show vehicle occupants that the target lane is clear before executing the lane change, the system 170 increases the level of trust the vehicle occupants have in the autonomous or semi-autonomous driving system of the over-actuated vehicle 100. As those skilled in the art are aware, trust is an important issue impacting the acceptance of autonomous and semi-autonomous vehicles by consumers.

Figure 4B:
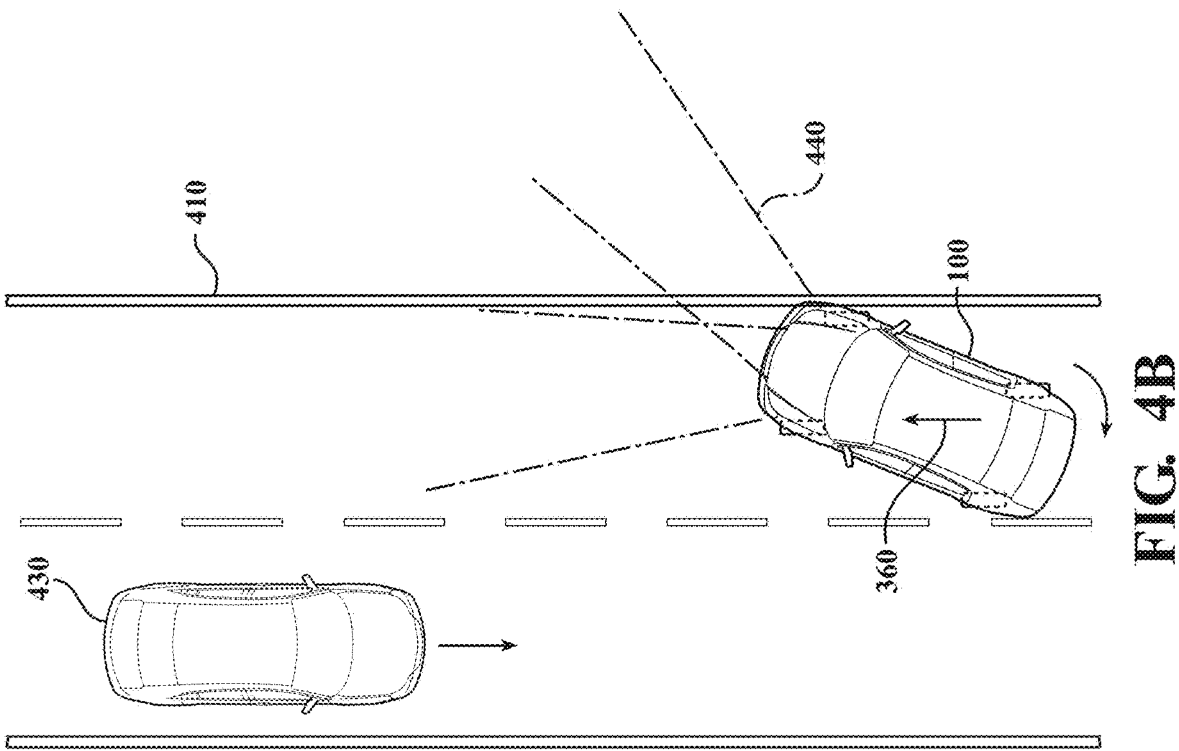
FIGS. 4A and 4B illustrate reorienting the cabin of a moving over-actuated vehicle relative to the direction of travel of the over-actuated vehicle, in accordance with another illustrative embodiment of the invention.
Figure 4A:
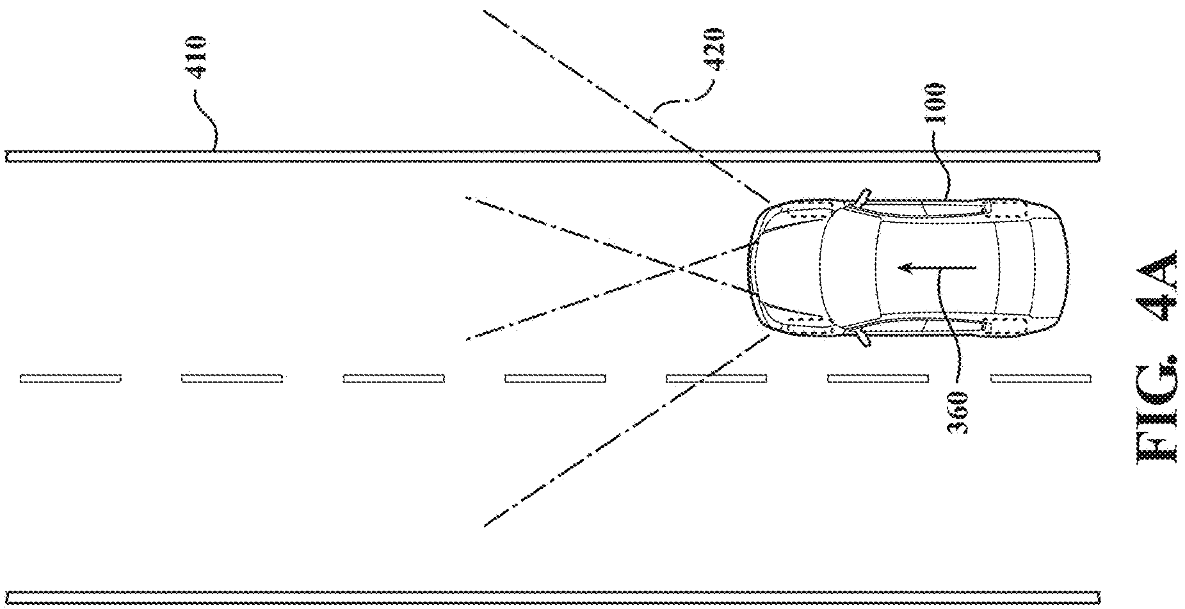

FIGS. 4A and 4B illustrate reorienting the cabin of a moving over-actuated vehicle 100 relative to the direction of travel 360 of the over-actuated vehicle, in accordance with a second illustrative embodiment of the invention. In FIG. 4A, an over-actuated vehicle 100 is traveling on a roadway 410 at nighttime. The headlights 175 of the over-actuated vehicle 100 are on, producing a light pattern 420 ahead. The direction of travel 360 is as indicated in FIG. 4A. In FIG. 4B, situation detection module 220 has detected oncoming traffic 430 (one or more road users traveling in the opposite direction on the roadway 410) by analyzing sensor data 119 (camera images, LIDAR, radar, etc.).

In response to situation detection module 220 detecting oncoming traffic 430 at nighttime, reorientation module 230 controls the wheels 310 of over-actuated vehicle 100 to rotate the cabin of the over-actuated vehicle 100 to the right at an angle relative to the direction of travel 360 while the over-actuated vehicle 100 continues to travel along the roadway 410, as shown in FIG. 4B. That is, reorientation module 230 rotates the cabin away from the oncoming traffic 430 to avoid shining the headlights 175 of the over-actuated vehicle 100 directly into the oncoming traffic 430. This reorientation of the cabin at an angle causes the light pattern 420 of the headlights 175 to shift to the right, resulting in the modified light pattern 440 shown in FIG. 4B.

In some implementations of the second embodiment, reorientation module 230 includes further machine-readable instructions that, when executed by the one or more processors 110, cause the one or more processors 110 to control automatically the wheels 310 of the over-actuated vehicle 100 to re-align the cabin of the over-actuated vehicle 100 with the direction of travel 360 when there is no longer oncoming traffic 430 on the roadway 410. That is, once situation detection module 220 detects that there is no longer oncoming traffic 430 present on roadway 410, reorientation module 230 automatically controls the wheels 310 to re-align the cabin with the direction of travel 360 (the direction in which the wheels 310 are pointed).

As with the first embodiment discussed above, the second embodiment is equally applicable to a manually driven over-actuated vehicle 100 and an autonomous or semi-autonomous over-actuated vehicle 100.

Figure 5:
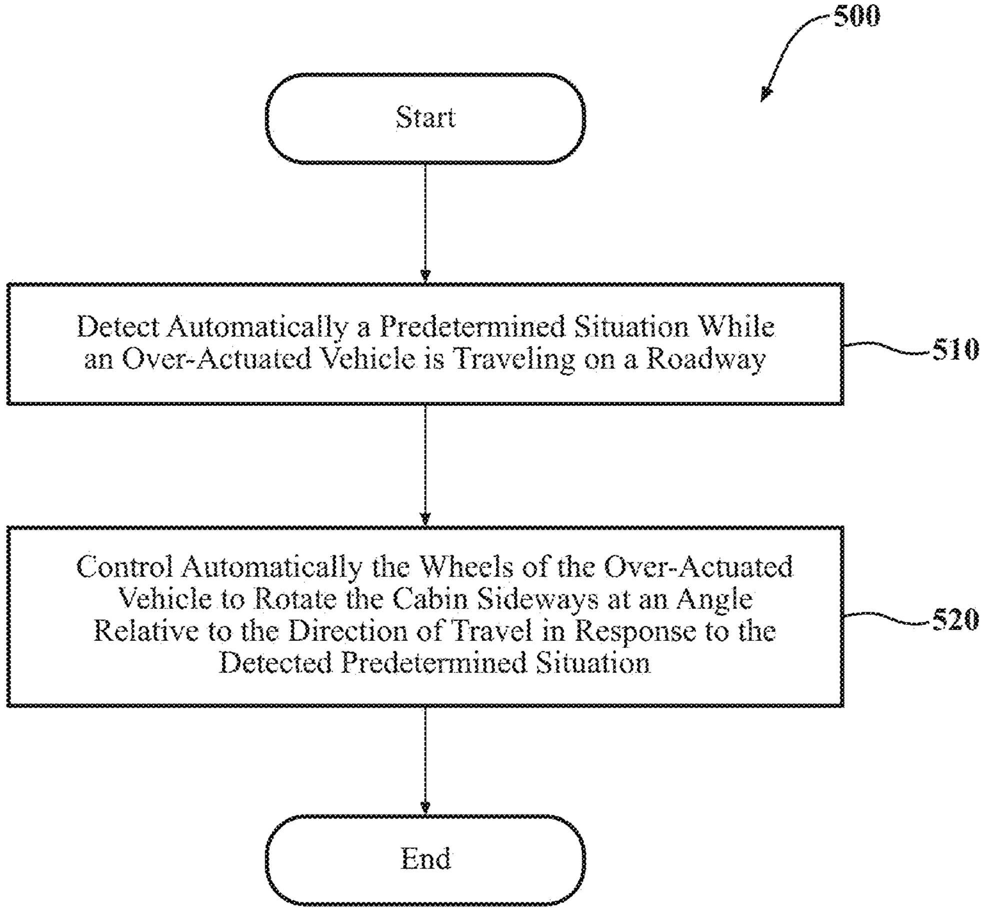
FIG. 5 is a flowchart of a method of reactively reorienting a moving vehicle, in accordance with an illustrative embodiment of the invention.

FIG. 5 is a flowchart of a method 500 of reactively reorienting a moving vehicle, in accordance with an illustrative embodiment of the invention. Method 500 will be discussed from the perspective of the reactive moving-vehicle reorientation system 170 in FIG. 2. While method 500 is discussed in combination with system 170, it should be appreciated that method 500 is not limited to being implemented within system 170, but system 170 is instead one example of a system that may implement the method 500.

At block 510, situation detection module 220 detects automatically, at an over-actuated vehicle 100, a predetermined situation while the over-actuated vehicle 100 is traveling on a roadway. Illustrative examples of predetermined situations are discussed in detail above in connection with the first embodiment of FIGS. 3A-3C (imminent lane change) and the second embodiment of FIGS. 4A and 4B (oncoming traffic at nighttime). Some of the techniques by which situation detection module 220 can detect an imminent lane change of over-actuated vehicle 100 or oncoming traffic 430 at nighttime are also discussed above.

At block 520, reorientation module 230 controls automatically the wheels 310 of the over-actuated vehicle 100 to rotate the cabin of the over-actuated vehicle 100 sideways at an angle relative to the direction of travel 360 of the over-actuated vehicle 100 in response to detecting the predetermined situation. How reorientation module 230 specifically reacts to detecting the predetermined situation is discussed in detail above in connection with the illustrative first embodiment of FIGS. 3A-3C (imminent lane change) and the second embodiment of FIGS. 4A and 4B (oncoming traffic at nighttime). In the first embodiment, reorientation module 230 rotates the cabin of the over-actuated vehicle 100 toward the target lane of an imminent lane change to improve an over-actuated-vehicle occupant's view of the target lane prior to execution of the lane change. In the second embodiment, reorientation module 230 rotates the cabin of the over-actuated vehicle 100 away from detected oncoming traffic 430 to avoid shining the headlights 175 of the over-actuated vehicle 100 directly into the oncoming traffic 430.

In some embodiments, method 500 includes additional actions not shown in FIG. 5. For example, in some implementations of the first embodiment (imminent lane change), reorientation module 230 analyzes sensor data 119 to ensure there is at least a predetermined amount of clearance before controlling automatically the wheels 310 of the over-actuated vehicle 100 to rotate the cabin of the over-actuated vehicle 100 toward the target lane. As discussed above, in one implementation, the angle of the cabin relative to the direction of travel 360 is a predetermined angle (e.g., 20 degrees). In another implementation, the angle is based on the measured available clearance in the target lane based on an analysis of sensor data 119 by reorientation module 230. In yet another implementation, the angle is based on the over-actuated vehicle occupant's (e.g., the driver's) detected gaze direction, based on an analysis of sensor data 119. That is, the angle of rotation can be adapted to give the occupant of the over-actuated vehicle 100 the best possible view of the target lane based on the direction in which the occupant is currently looking just prior to the lane change. Further, reorientation module 230 can control automatically the wheels 310 of the over-actuated vehicle 100 to re-align the cabin of the over-actuated vehicle 100 with the direction of travel 360 in the target lane after the execution of the lane change in response to the over-actuated vehicle 100 being steered in a direction opposite that of the lane change.

Regarding the second embodiment (oncoming traffic at nighttime), method 500 can also include additional actions not shown in FIG. 5. In some implementations of the second embodiment, reorientation module 230 can control automatically the wheels 310 of the over-actuated vehicle 100 to re-align the cabin of the over-actuated vehicle 100 with the direction of travel 360 when there is no longer oncoming traffic 430 on the roadway, as discussed above.

Designation of the two illustrative embodiments discussed above as a "first embodiment" and a "second embodiment" is arbitrary and does not in any way indicate a preference or ranking of importance for either embodiment.

FIG. 1 will now be discussed in full detail as an example vehicle environment within which the systems and methods disclosed herein may be implemented. In some instances, the over-actuated vehicle 100 can be configured to switch selectively between an autonomous mode, one or more semi-autonomous operational modes, and/or a manual mode. Such switching, also referred to as handover when transitioning to a manual mode, can be implemented in a suitable manner, now known or later developed. "Manual mode" means that all of or a majority of the navigation and/or maneuvering of the vehicle is performed according to inputs received from a user (e.g., human driver/operator).

In one or more implementations, the over-actuated vehicle 100 can be an autonomous vehicle. As used herein, "autonomous vehicle" refers to a vehicle that operates in an autonomous mode. "Autonomous mode" refers to navigating and/or maneuvering a vehicle along a travel route using one or more computing devices to control the vehicle with minimal or no input from a human driver/operator. In one implementation, the over-actuated vehicle 100 is configured with one or more semi-autonomous operational modes in which one or more computing devices perform a portion of the navigation and/or maneuvering of the vehicle along a travel route, and a vehicle operator (i.e., driver) provides inputs to the vehicle to perform a portion of the navigation and/or maneuvering of the over-actuated vehicle 100 along a travel route. Thus, in one or more implementations, the over-actuated vehicle 100 operates autonomously according to a particular defined level of autonomy.

The over-actuated vehicle 100 can include one or more processors 110. In one or more arrangements, the one or more processors 110 can be a main processor of the over-actuated vehicle 100. For instance, the one or more processors 110 can be an electronic control unit (ECU). The over-actuated vehicle 100 can include one or more data stores 115 for storing one or more types of data. The data store(s) 115 can include volatile and/or non-volatile memory. Examples of suitable data stores 115 include RAM, flash memory, ROM, PROM (Programmable Read-Only Memory), EPROM, EEPROM (Electrically Erasable Programmable Read-Only Memory), registers, magnetic disks, optical disks, hard drives, or any other suitable storage medium, or any combination thereof. The data store(s) 115 can be a component(s) of the one or more processors 110, or the data store(s) 115 can be operatively connected to the one or more processors 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. In one or more arrangement, the map data 116 can include one or more terrain maps 117. The terrain map(s) 117 can include information about the ground, terrain, roads, surfaces, and/or other features of one or more geographic areas. In one or more arrangement, the map data 116 can include one or more static obstacle maps 118. The static obstacle map(s) 118 can include information about one or more static obstacles located within one or more geographic areas.

The one or more data stores 115 can include sensor data 119. In this context, "sensor data" means any information about the sensors that a vehicle is equipped with, including the capabilities and other information about such sensors. As will be explained below, the over-actuated vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120. As discussed above, in some embodiments, over-actuated vehicle 100 can receive sensor data from other connected vehicles, from devices associated with ORUs, or both.

As noted above, the over-actuated vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operatively connected to the one or more processors 110, the data store(s) 115, and/or another element of the over-actuated vehicle 100 (including any of the elements shown in FIG. 1).

The sensor system 120 can include any suitable type of sensor. Various examples of different types of sensors will be described herein. However, it will be understood that the implementations are not limited to the particular sensors described. The sensor system 120 can include one or more vehicle sensors 121. The vehicle sensors 121 can detect, determine, and/or sense information about the over-actuated vehicle 100 itself, including the operational status of various vehicle components and systems.

In one or more arrangements, the vehicle sensors 121 can be configured to detect, and/or sense position and/orientation changes of the over-actuated vehicle 100, such as, for example, based on inertial acceleration. In one or more arrangements, the vehicle sensors 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensors 121 can be configured to detect, and/or sense one or more characteristics of the over-actuated vehicle 100. In one or more arrangements, the vehicle sensors 121 can include a speedometer to determine a current speed of the over-actuated vehicle 100.

Alternatively, or in addition, the sensor system 120 can include one or more environment sensors 122 configured to acquire, and/or sense driving environment data. "Driving environment data" includes any data or information about the external environment in which a vehicle is located or one or more portions thereof. For example, the one or more environment sensors 122 can be configured to detect, quantify, and/or sense obstacles in at least a portion of the external environment of the over-actuated vehicle 100 and/or information/data about such obstacles. The one or more environment sensors 122 can be configured to detect, measure, quantify, and/or sense other things in at least a portion the external environment of the over-actuated vehicle 100, such as, for example, nearby vehicles, lane markers, signs, traffic lights, traffic signs, lane lines, crosswalks, curbs proximate the over-actuated vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the over-actuated vehicle 100. However, it will be understood that the implementations are not limited to the particular sensors described. As an example, in one or more arrangements, the sensor system 120 can include one or more radar sensors 123, one or more LIDAR sensors 124, one or more sonar sensors 125, and/or one or more cameras 126.

The over-actuated vehicle 100 can further include a communication system 130. The communication system 130 can include one or more components configured to facilitate communication between the over-actuated vehicle 100 and one or more communication sources. Communication sources, as used herein, refers to people or devices with which the over-actuated vehicle 100 can communicate with, such as external networks, computing devices, operator or occupants of the over-actuated vehicle 100, or others. As part of the communication system 130, the over-actuated vehicle 100 can include an input system 131. An "input system" includes any device, component, system, element or arrangement or groups thereof that enable information/data to be entered into a machine. In one or more examples, the input system 131 can receive an input from a vehicle occupant (e.g., a driver or a passenger). The over-actuated vehicle 100 can include an output system 132. An "output system" includes any device, component, or arrangement or groups thereof that enable information/data to be presented to the one or more communication sources (e.g., a person, a vehicle passenger, etc.). The communication system 130 can further include specific elements which are part of or can interact with the input system 131 or the output system 132, such as one or more display device(s) 133, and one or more audio device(s) 134 (e.g., speakers and microphones).

The over-actuated vehicle 100 can include one or more vehicle systems 140. Various examples of the one or more vehicle systems 140 are shown in FIG. 1. However, the over-actuated vehicle 100 can include more, fewer, or different vehicle systems. It should be appreciated that although particular vehicle systems are separately defined, each or any of the systems or portions thereof may be otherwise combined or segregated via hardware and/or software within the over-actuated vehicle 100. The over-actuated vehicle 100 can include a propulsion system 141, a braking system 142, a steering system 143, throttle system 144, a transmission system 145, a signaling system 146, and/or a navigation system 147. Each of these systems can include one or more devices, components, and/or combinations thereof, now known or later developed.

The one or more processors 110 and/or the autonomous driving module(s) 160 can be operatively connected to communicate with the various vehicle systems 140 and/or individual components thereof. For example, returning to FIG. 1, the one or more processors 110 and/or the autonomous driving module(s) 160 can be in communication to send and/or receive information from the various vehicle systems 140 to control the movement, speed, maneuvering, heading, direction, etc. of the over-actuated vehicle 100. The one or more processors 110 and/or the autonomous driving module(s) 160 may control some or all of these vehicle systems 140 and, thus, may be partially or fully autonomous.

The over-actuated vehicle 100 can include one or more modules, at least some of which are described herein. The modules can be implemented as computer-readable program code that, when executed by a processor 110, implement one or more of the various processes described herein. The processor 110 can be a device, such as a CPU, which is capable of receiving and executing one or more threads of instructions for the purpose of performing a task. One or more of the modules can be a component of the one or more processors 110, or one or more of the modules can be executed on and/or distributed among other processing systems to which the one or more processors 110 is operatively connected. The modules can include instructions (e.g., program logic) executable by one or more processors 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

In some implementations, the over-actuated vehicle 100 can include one or more autonomous driving modules 160. The autonomous driving module(s) 160 can be configured to receive data from the sensor system 120 and/or any other type of system capable of capturing information relating to the over-actuated vehicle 100 and/or the external environment of the over-actuated vehicle 100. In one or more arrangements, the autonomous driving module(s) 160 can use such data to generate one or more driving scene models. The autonomous driving module(s) 160 can determine the position and velocity of the over-actuated vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to determine travel path(s), current autonomous driving maneuvers for the over-actuated vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the over-actuated vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the over-actuated vehicle 100 or one or more systems thereof (e.g., one or more of vehicle systems 140). The noted functions and methods will become more apparent with a further discussion of the figures.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-7, but the implementations are not limited to the illustrated structure or application.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by, or in connection with, an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a LAN or a WAN, or the connection can be made to an external computer (for example, through the Internet using an Internet Service Provider).

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions. The term "module," as used herein, is not intended, under any circumstances, to invoke interpretation of the appended claims under 35 U.S.C. § 112 (f).

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A system for reactively reorienting a moving vehicle, the system comprising:

a processor; and a memory storing machine-readable instructions that, when executed by the processor, cause the processor to:

detect automatically, at an over-actuated vehicle, a predetermined situation while the over-actuated vehicle is traveling on a roadway, wherein the over-actuated vehicle is a vehicle whose wheels can be independently propelled and steered; and control automatically the wheels of the over-actuated vehicle to rotate a cabin of the over-actuated vehicle sideways at an angle relative to a direction of travel of the over-actuated vehicle in response to detecting the predetermined situation, wherein the wheels continue to roll in the direction of travel as the over-actuated vehicle continues to travel along the roadway with the cabin rotated at the angle.

2. The system of claim 1, wherein:

the predetermined situation is a lane change of the over-actuated vehicle being imminent; and the cabin of the over-actuated vehicle is rotated toward a target lane of the lane change to improve an over-actuated-vehicle occupant's view of the target lane prior to execution of the lane change.

3. The system of claim 2, wherein the machine-readable instructions include further instructions that, when executed by the processor, cause the processor to analyze sensor data to ensure there is at least a predetermined amount of clearance before controlling automatically the wheels of the over-actuated vehicle to rotate the cabin of the over-actuated vehicle toward the target lane.

4. The system of claim 2, wherein the angle relative to the direction of travel is one of:

a predetermined angle;

an angle that is based on a measured clearance in the target lane from an analysis of sensor data; and an angle that is based on the over-actuated-vehicle occupant's detected gaze direction.

5. The system of claim 2, wherein the machine-readable instructions include further instructions that, when executed by the processor, cause the processor to control automatically the wheels of the over-actuated vehicle to re-align the cabin of the over-actuated vehicle with the direction of travel in the target lane after the execution of the lane change in response to the over-actuated vehicle being steered in a direction opposite that of the lane change.

6. The system of claim 1, wherein the predetermined situation is oncoming traffic on the roadway at nighttime and the cabin of the over-actuated vehicle is rotated away from the oncoming traffic to avoid shining headlights of the over-actuated vehicle directly into the oncoming traffic.

7. The system of claim 6, wherein the machine-readable instructions include further instructions that, when executed by the processor, cause the processor to control automatically the wheels of the over-actuated vehicle to re-align the cabin of the over-actuated vehicle with the direction of travel when there is no longer oncoming traffic on the roadway.

8. The system of claim 1, wherein the over-actuated vehicle is one of a semi-autonomous vehicle and an autonomous vehicle.

9. A non-transitory computer-readable medium for reactively reorienting a moving vehicle and storing instructions that, when executed by a processor, cause the processor to:

detect automatically, at an over-actuated vehicle, a predetermined situation while the over-actuated vehicle is traveling on a roadway, wherein the over-actuated vehicle is a vehicle whose wheels can be independently propelled and steered; and control automatically the wheels of the over-actuated vehicle to rotate a cabin of the over-actuated vehicle sideways at an angle relative to a direction of travel of the over-actuated vehicle in response to detecting the predetermined situation, wherein the wheels continue to roll in the direction of travel as the over-actuated vehicle continues to travel along the roadway with the cabin rotated at the angle.

10. The non-transitory computer-readable medium of claim 9, wherein:

the predetermined situation is a lane change of the over-actuated vehicle being imminent; and the cabin of the over-actuated vehicle is rotated toward a target lane of the lane change to improve an overactuated-vehicle occupant's view of the target lane prior to execution of the lane change.

11. The non-transitory computer-readable medium of claim 10, wherein the angle relative to the direction of travel is one of:

a predetermined angle;

an angle that is based on a measured clearance in the target lane from an analysis of sensor data; and an angle that is based on the over-actuated-vehicle occupant's detected gaze direction.

12. The non-transitory computer-readable medium of claim 9, wherein the predetermined situation is oncoming traffic on the roadway at nighttime and the cabin of the over-actuated vehicle is rotated away from the oncoming traffic to avoid shining headlights of the over-actuated vehicle directly into the oncoming traffic.

13. A method, comprising:

detecting automatically, at an over-actuated vehicle, a predetermined situation while the over-actuated vehicle is traveling on a roadway, wherein the over-actuated vehicle is a vehicle whose wheels can be independently propelled and steered; and controlling automatically the wheels of the over-actuated vehicle to rotate a cabin of the over-actuated vehicle sideways at an angle relative to a direction of travel of the over-actuated vehicle in response to detecting the predetermined situation, wherein the wheels continue to roll in the direction of travel as the over-actuated vehicle continues to travel along the roadway with the cabin rotated at the angle.

14. The method of claim 13, wherein:

the predetermined situation is a lane change of the over-actuated vehicle being imminent; and the cabin of the over-actuated vehicle is rotated toward a target lane of the lane change to improve an over-actuated-vehicle occupant's view of the target lane prior to execution of the lane change.

15. The method of claim 14, further comprising analyzing sensor data to ensure there is at least a predetermined amount of clearance before controlling automatically the wheels of the over-actuated vehicle to rotate the cabin of the over-actuated vehicle toward the target lane.

16. The method of claim 14, wherein the angle relative to the direction of travel is one of:

a predetermined angle;

an angle that is based on a measured clearance in the target lane from an analysis of sensor data; and an angle that is based on the over-actuated-vehicle occupant's detected gaze direction.

17. The method of claim 14, further comprising controlling automatically the wheels of the over-actuated vehicle to re-align the cabin of the over-actuated vehicle with the direction of travel in the target lane after the execution of the lane change in response to the over-actuated vehicle being steered in a direction opposite that of the lane change.

18. The method of claim 13, wherein the predetermined situation is oncoming traffic on the roadway at nighttime and the cabin of the over-actuated vehicle is rotated away from the oncoming traffic to avoid shining headlights of the over-actuated vehicle directly into the oncoming traffic.

19. The method of claim 18, further comprising controlling automatically the wheels of the over-actuated vehicle to re-align the cabin of the over-actuated vehicle with the direction of travel when there is no longer oncoming traffic on the roadway.

20. The method of claim 13, wherein the over-actuated vehicle is one of a semi-autonomous vehicle and an autonomous vehicle.

* * * * *